(12) United States Patent
Jung et al.

(10) Patent No.: US 11,603,192 B2
(45) Date of Patent: Mar. 14, 2023

(54) FOLDABLE BLADE ASSEMBLY

(71) Applicants: Hyundai Motor Company, Seoul (KR); Kia Motors Corporation, Seoul (KR)

(72) Inventors: Sang Hyun Jung, Hwaseong-si (KR); Jae Young Choi, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 203 days.

(21) Appl. No.: 17/144,437

(22) Filed: Jan. 8, 2021

(65) Prior Publication Data
US 2022/0048616 A1    Feb. 17, 2022

(30) Foreign Application Priority Data
Aug. 12, 2020   (KR) .................. 10-2020-0100966

(51) Int. Cl.
*B64C 27/50* (2006.01)
*B64D 27/24* (2006.01)
*F01D 5/14* (2006.01)
*B64C 11/28* (2006.01)

(52) U.S. Cl.
CPC .............. *B64C 27/50* (2013.01); *B64C 11/28* (2013.01); *B64D 27/24* (2013.01); *F01D 5/14* (2013.01); *F05D 2220/90* (2013.01)

(58) Field of Classification Search
None
See application file for complete search history.

(56) References Cited

U.S. PATENT DOCUMENTS

| | | | |
|---|---|---|---|
| 8,376,264 B1* | 2/2013 | Hong | B64C 27/605 244/17.23 |
| 10,112,698 B2* | 10/2018 | Barnes | B64C 39/024 |
| 10,392,104 B1* | 8/2019 | Urban | B64C 27/52 |
| 10,494,088 B1* | 12/2019 | Coralie | B64C 27/82 |
| 10,800,517 B1* | 10/2020 | Coralie | B64C 11/28 |
| 10,843,795 B2* | 11/2020 | Prager | B64C 39/024 |
| 2019/0055003 A1 | 2/2019 | Luo et al. | |
| 2019/0092461 A1* | 3/2019 | Duffy | B64C 11/28 |
| 2019/0210718 A1 | 7/2019 | Wang | |
| 2019/0382106 A1* | 12/2019 | Prager | B64C 27/50 |
| 2019/0389569 A1 | 12/2019 | Paulson et al. | |

* cited by examiner

*Primary Examiner* — Juan G Flores
(74) *Attorney, Agent, or Firm* — Morgan, Lewis & Bockius LLP (57) ABSTRACT

A foldable blade assembly may include a first blade, a motor configured to rotate the first blade, a second blade of which a rotation center coincides with a rotation center of the first blade, and an actuator configured to move the second blade upward or downward to selectively couple the second blade to the first blade so that the second blade and the first blade are rotated together or configured to release the coupling between the second blade and the first blade.

14 Claims, 14 Drawing Sheets

FOLDABLE BLADE ASSEMBLY

CROSS REFERENCE TO RELATED APPLICATION

The present application claims priority to Korean Patent Application No. 10-2020-0100966 filed on Aug. 12, 2020, the entire contents of which is incorporated herein for all purposes by this reference.

BACKGROUND OF THE PRESENT INVENTION

Field of the Invention

The present invention relates to a foldable blade assembly, and more particularly, to a foldable blade assembly having a function of automatically folding a blade to minimize resistance due to a blade, which is not in use in a cruise mode, in an urban air mobility having a vertical movement mode and a driving mode including the cruise mode.

Description of Related Art

Recently, technology development for drones and urban air mobilities has been actively carried out. Meanwhile, in the conventionally developed drone or urban air mobility, since a blade is folded for minimizing a volume when the drone or urban air mobility is loaded or moved, a folding of the blade is possible only by human hands in a state in which a flight of the drone or urban air mobility is completed. Thus, it is not possible to minimize resistance of wind during flight.

Therefore, in a cruise mode which is most operating modes of drones or urban air mobilities, there is a demand for a technology configured for minimizing resistance of wind due to blades.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a foldable blade assembly having a function of automatically folding a blade to minimize resistance due to a blade, which is not in use in a cruise mode, in an urban air mobility having a vertical movement mode and a driving mode including the cruise mode.

According to one aspect, there is provided a foldable blade assembly including a first blade, a motor configured to rotate the first blade, a second blade of which a rotation center coincides with a rotation center of the first blade, and an actuator configured to move the second blade upward or downward to selectively couple the second blade to the first blade so that the second blade and the first blade are rotated together or configured to release the coupling between the second blade and the first blade.

The foldable blade assembly may further include a first shaft fixedly connected to the first blade and coupling the first blade to the motor, a second shaft fixedly connected to the second blade and coupled to or separated from an internal side of the first shaft, and a third shaft connected to the actuator and configured to move the second shaft upward or downward by being moved upward or downward as the actuator is driven.

A hollow may be formed in the motor, and the third shaft may pass through the hollow of the motor, may be inserted into the first shaft, and may be moved upward or downward as the actuator is driven to move the second shaft upward or downward so that the second blade may be coupled to the first blade to be rotated together therewith or a coupling between the second blade and the first blade may be released.

A through-hole may be formed in a center portion of the first shaft, an internal surface of the through-hole may be formed to be inclined downward to allow a diameter of the internal surface of the through-hole to become narrower toward the motor, and the second shaft may be formed in a shape corresponding to a shape of the through-hole of the first shaft to be inserted along an inclined surface formed on the internal surface of the through-hole of the first shaft.

A female serration or a male serration may be formed on an inclined internal circumferential surface of the through-hole of the first shaft, and a male serration or a female serration may be formed on an inclined external circumferential surface of the second shaft.

A center portion of a rotation axis of the first blade may coincide with a center portion of a rotation axis of the second blade.

In a vertical movement mode, the first shaft and the second shaft may be serration-coupled so that power from the motor may be transmitted to the first blade and the second blade through the first shaft and the second shaft, and thus the first blade and the second blade may be rotated.

In a first blade folding mode, the actuator may move the third shaft upward to move the second blade upward with a predetermined distance, releasing a serration coupling between the second shaft and the first shaft.

In a second blade folding mode, the motor may rotate the first blade to be located below the second blade.

In a third blade folding mode, the actuator may move the third shaft downward to move the second blade downward, superposing the second blade to the first blade located below the second blade.

A first fixing groove may be provided on an upper surface of the first shaft, a fixing protrusion may be provided on a lower surface of the second blade at a position corresponding to a position at which the first fixing groove is provided, and in the vertical movement mode, the fixing protrusion of the second blade may be coupled to the first fixing groove.

A second fixing groove may be provided on an upper surface of the first blade, a fixing protrusion may be provided on a lower surface of the second blade at a position corresponding to a position at which the second fixing groove is provided, and in the third blade folding mode, the fixing protrusion of the second blade may be coupled to the second fixing groove.

The second shaft may be connected to the third shaft through a bearing assembly.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a foldable blade assembly according to various exemplary embodiments of the present invention will be described in detail with reference to the accompanying drawings.

Figure 1:
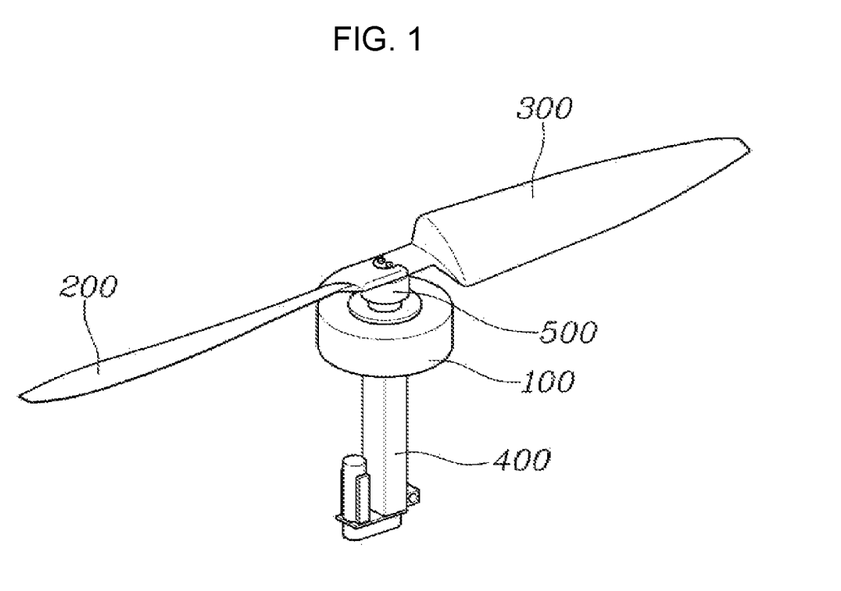
FIG. 1 is a perspective view exemplarily illustrating a foldable blade assembly according to various exemplary embodiments of the present invention.
Figure 2:
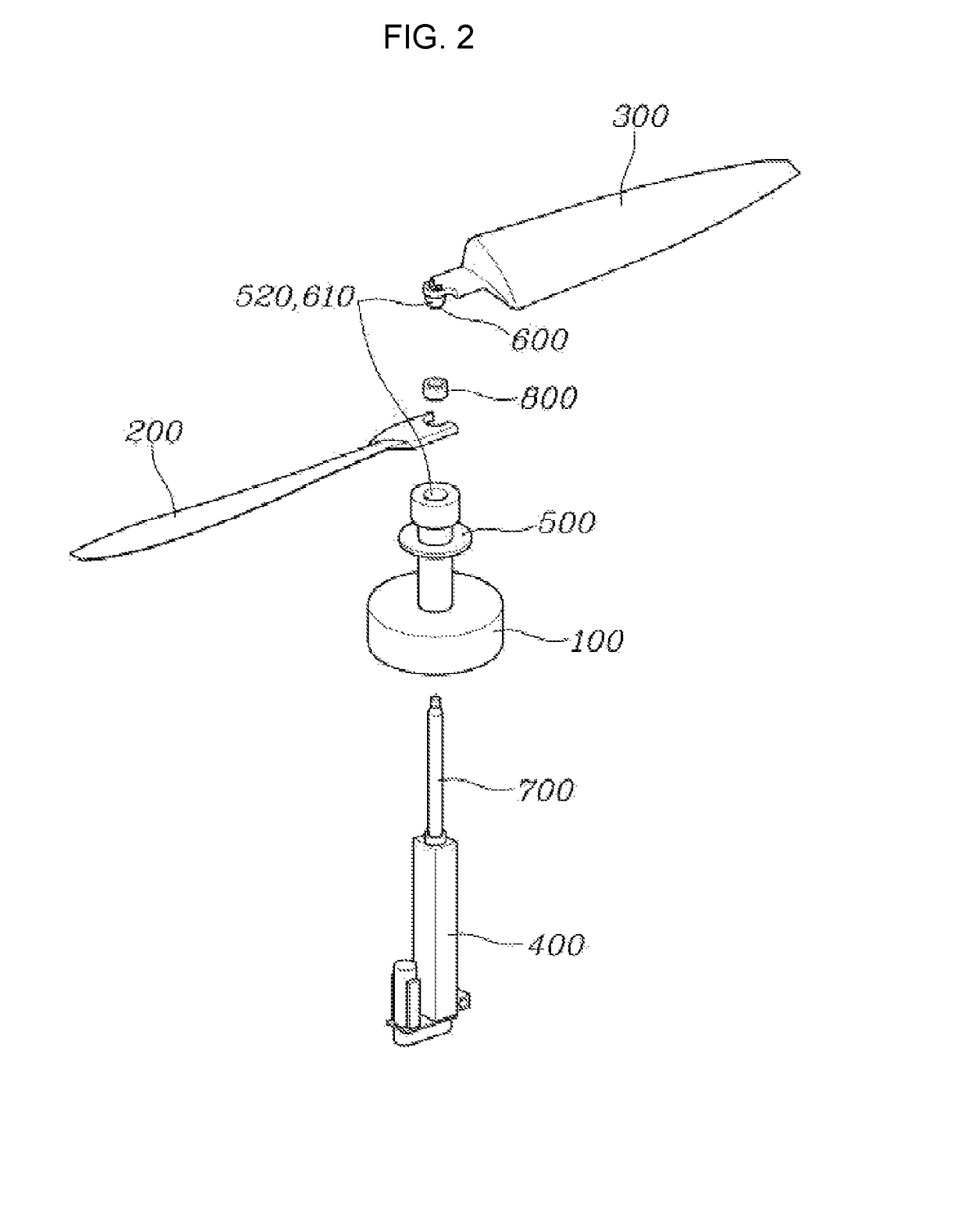
FIG. 2 is an exploded perspective view exemplarily illustrating the foldable blade assembly according to various exemplary embodiments of the present invention.
Figure 3:
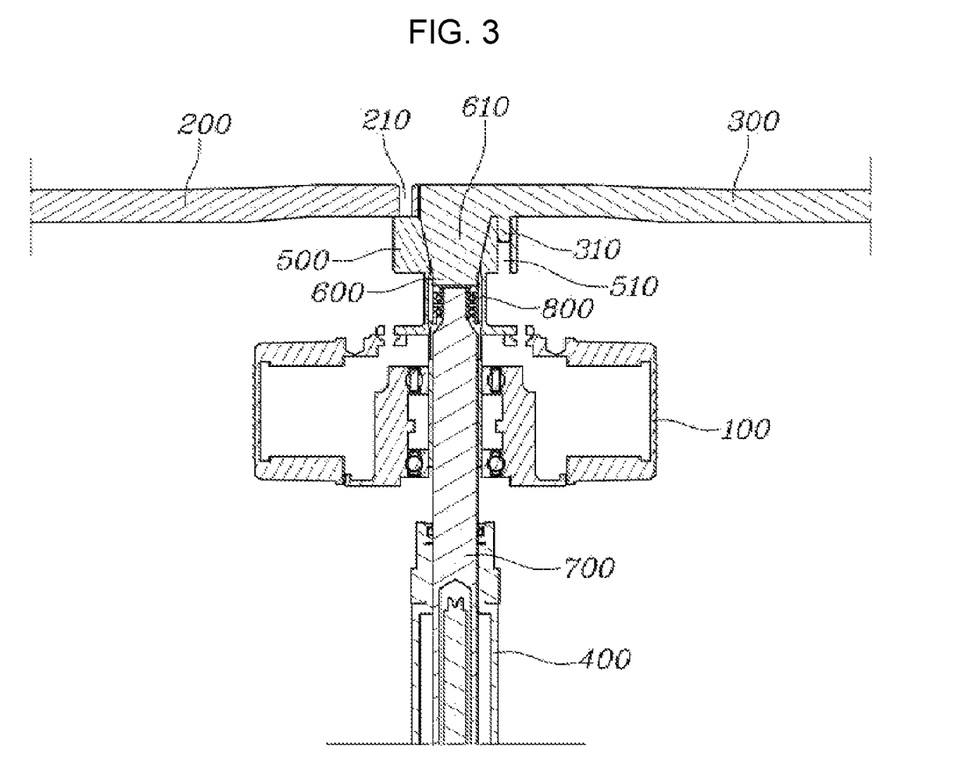
FIG. 3 is a cross-sectional view exemplarily illustrating the foldable blade assembly according to various exemplary embodiments of the present invention.
Figure 4:
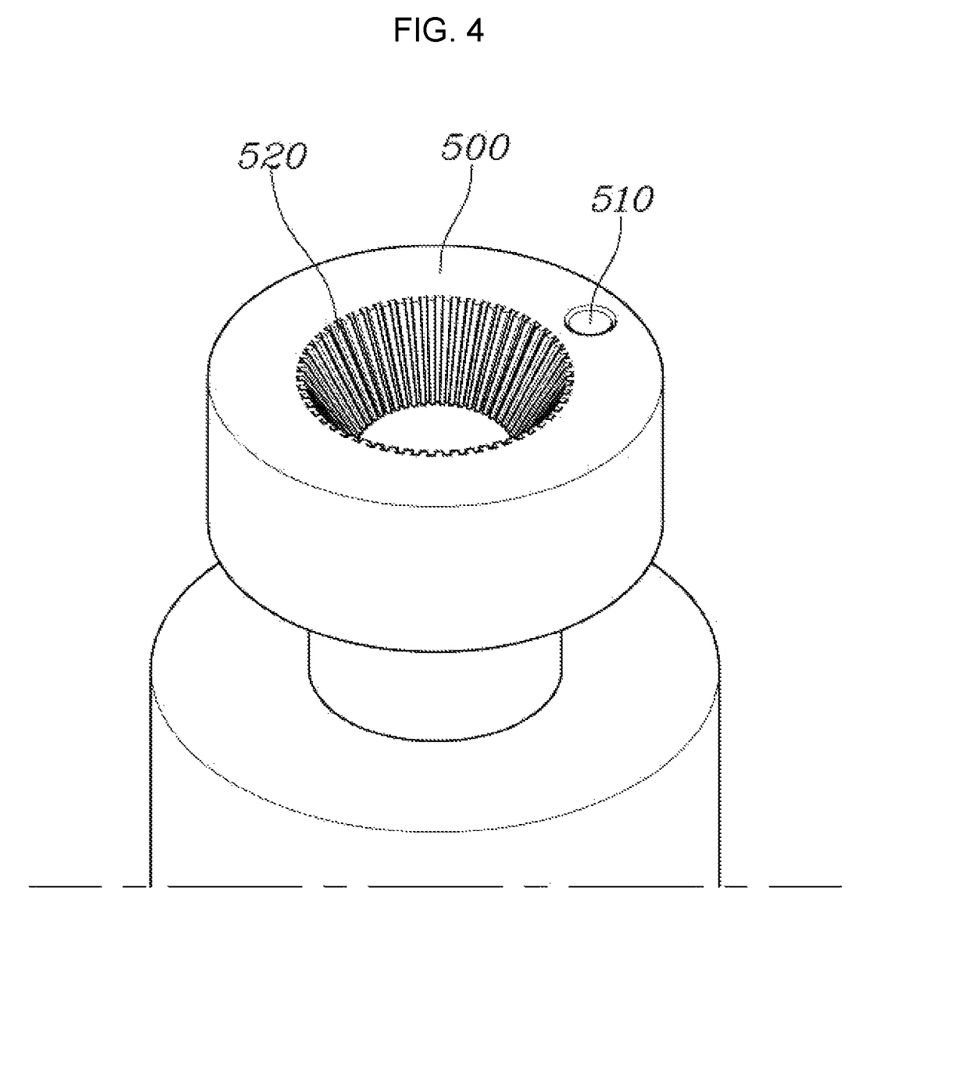
FIG. 4 is a diagram illustrating a first shaft of the foldable blade assembly according to various exemplary embodiments of the present invention.
Figure 5:
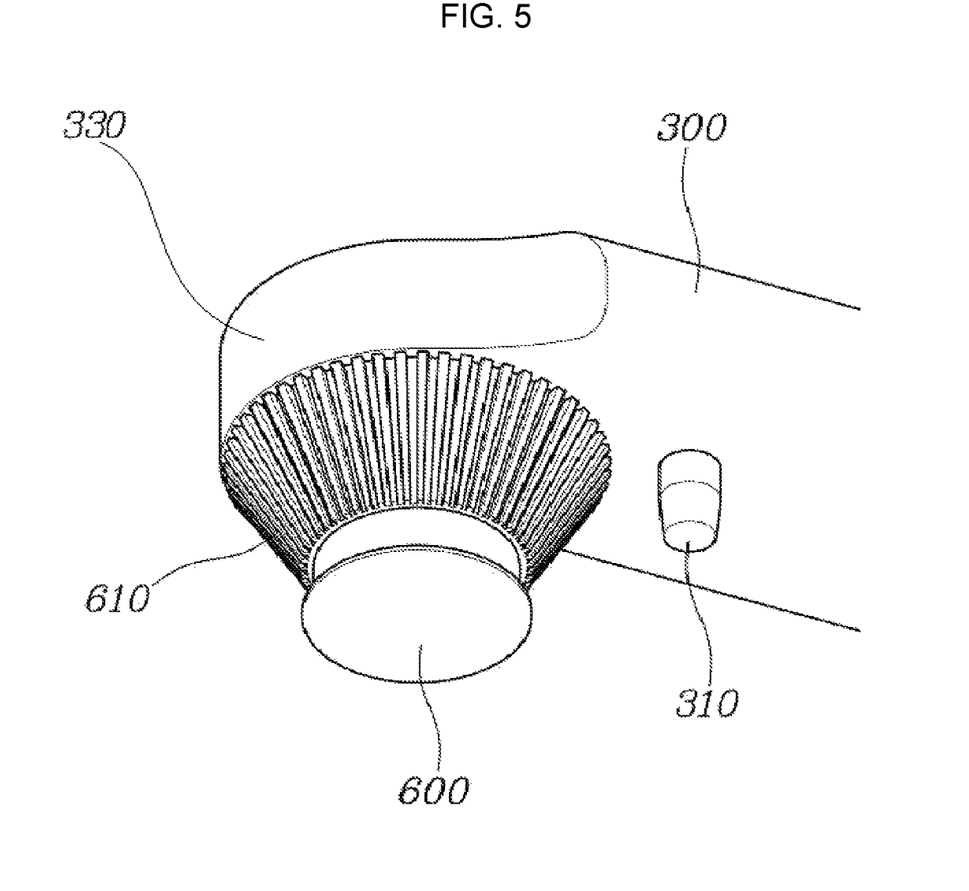
FIG. 5 is a diagram illustrating a second shaft coupled to a second blade of the foldable blade assembly according to various exemplary embodiments of the present invention.
Figure 6:
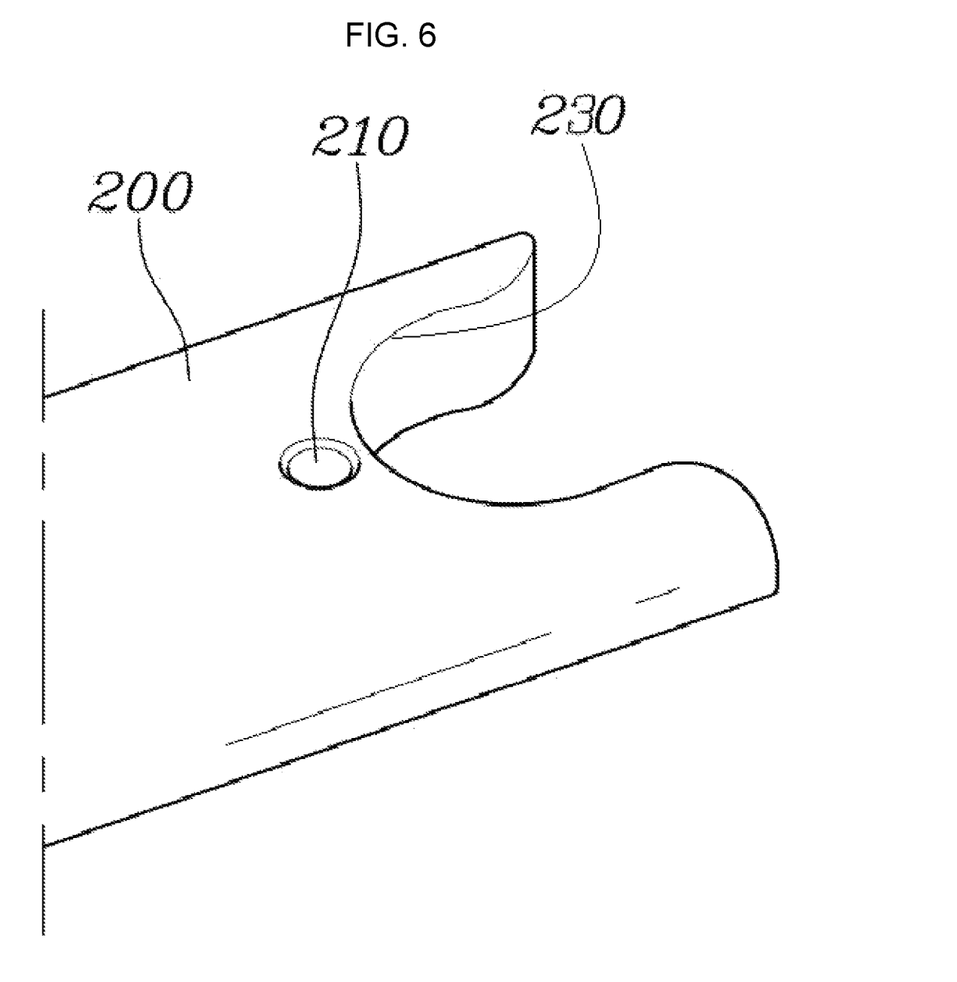
FIG. 6 is a diagram illustrating a second fixing groove formed in the first blade of the foldable blade assembly according to various exemplary embodiments of the present invention.
Figure 7:
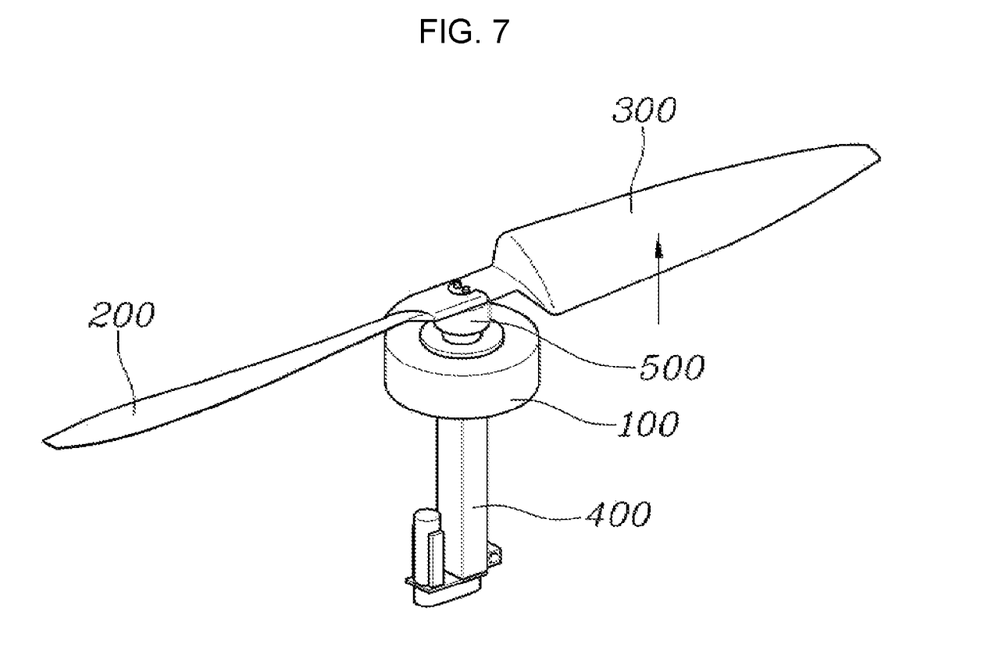
FIG. 7 and FIG. 8 are diagrams for describing a state of a vertical movement mode of the foldable blade assembly according to various exemplary embodiments of the present invention.
Figure 8:
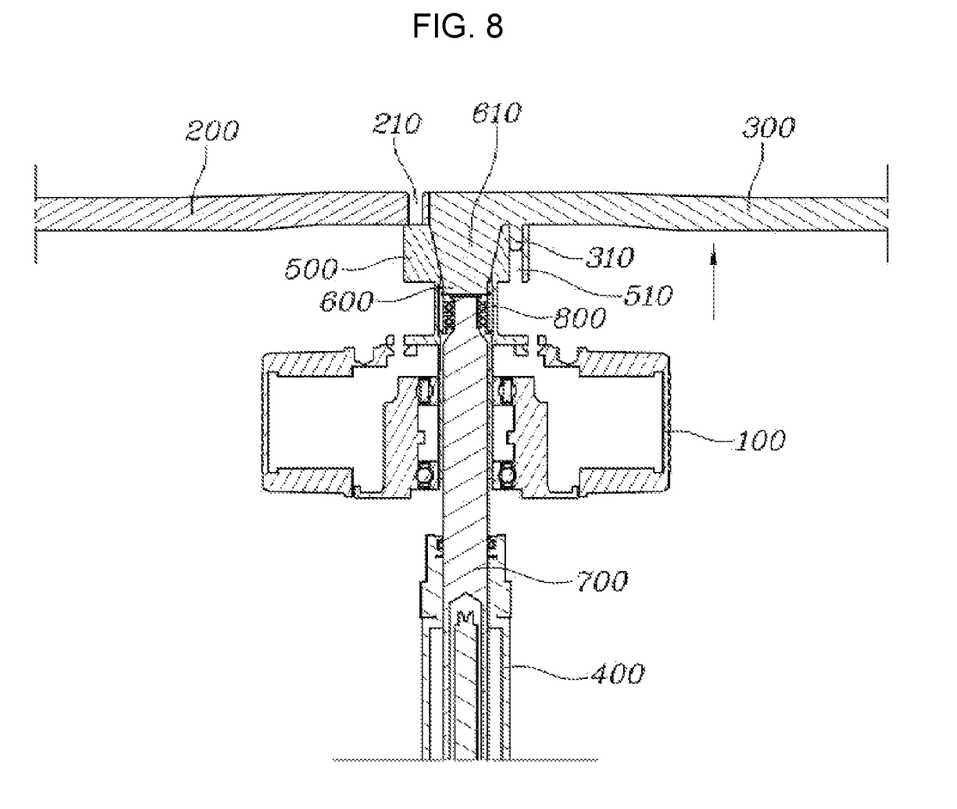
Figure 9:
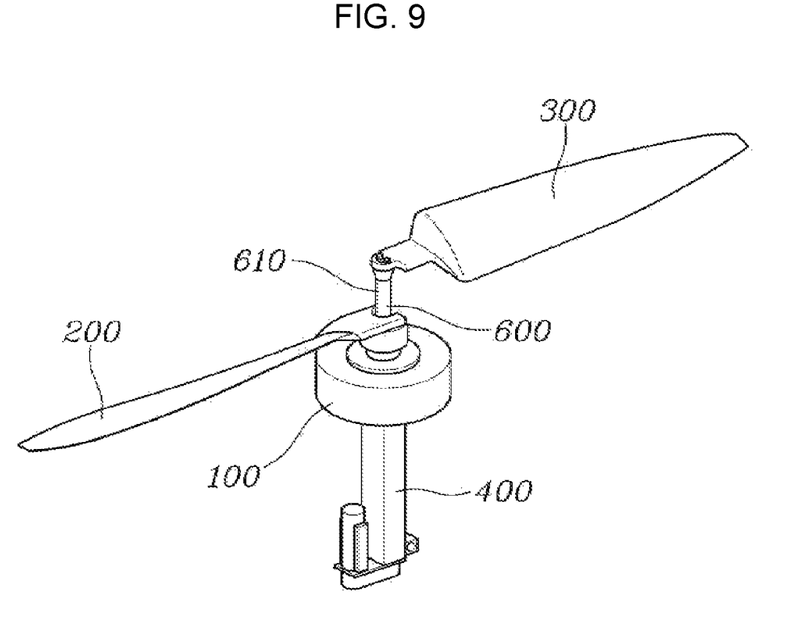
FIG. 9 and FIG. 10 are diagrams for describing that the second blade is moved upward in a first blade folding mode in the foldable blade assembly according to various exemplary embodiments of the present invention.
Figure 10:
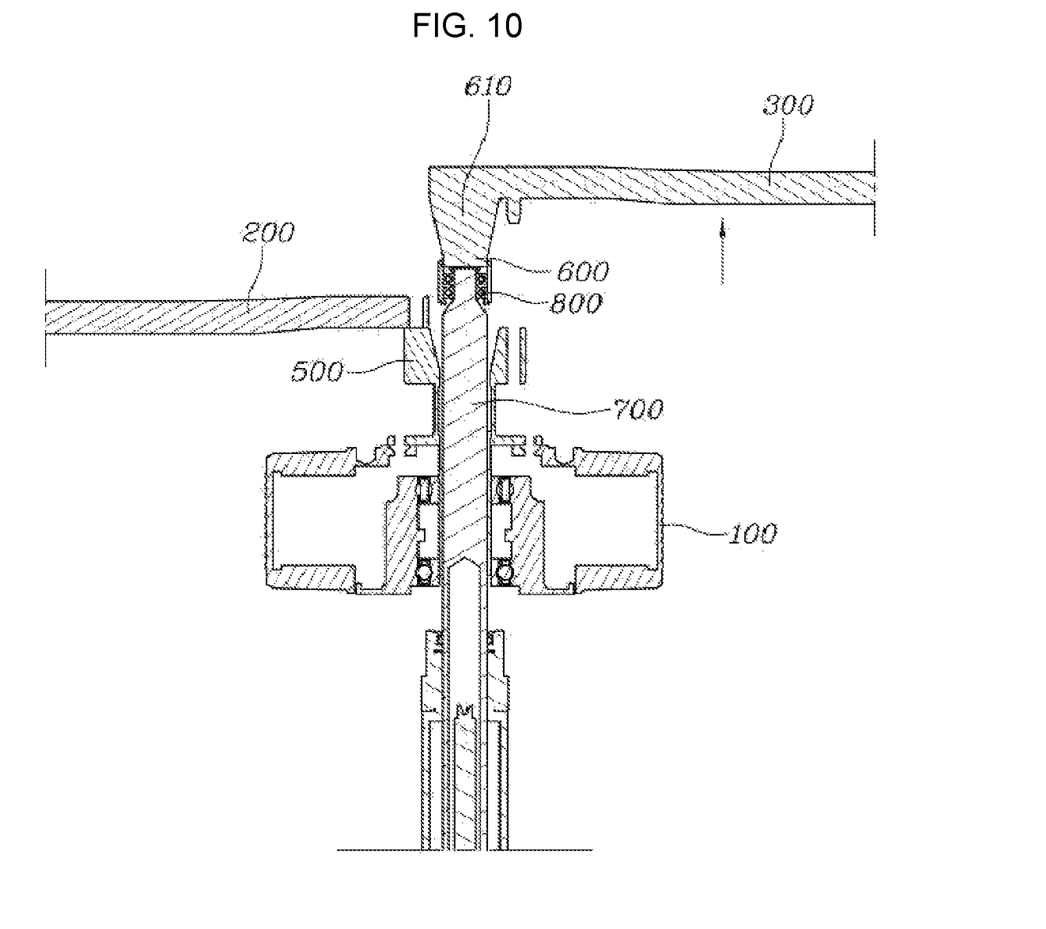
Figure 11:
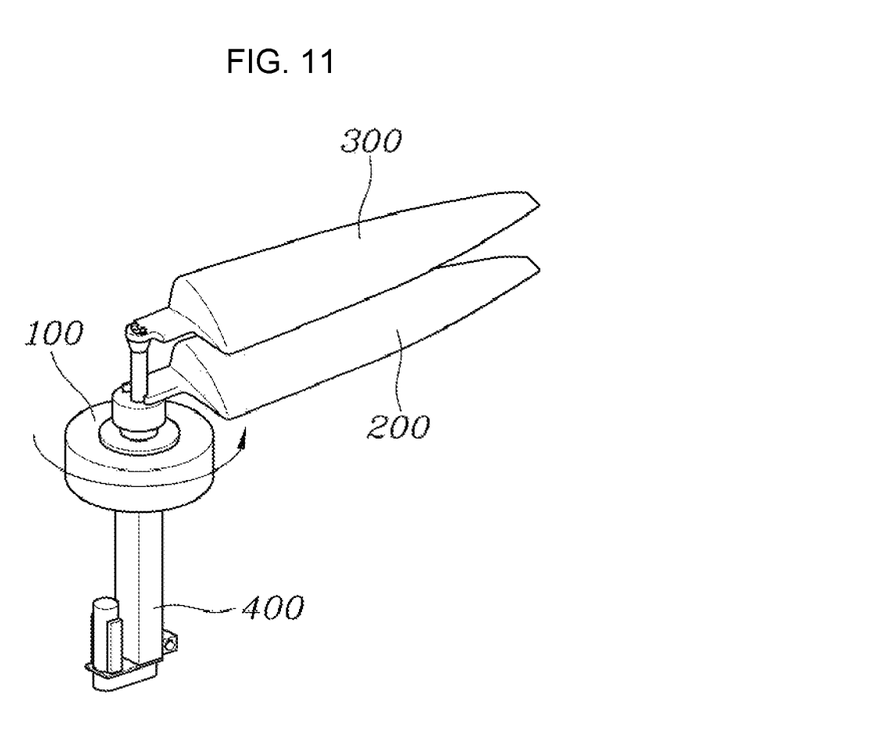
FIG. 11 and FIG. 12 are diagrams for describing that the first blade is rotated at 180 degrees in a second blade folding mode in the foldable blade assembly according to various exemplary embodiments of the present invention.
Figure 12:
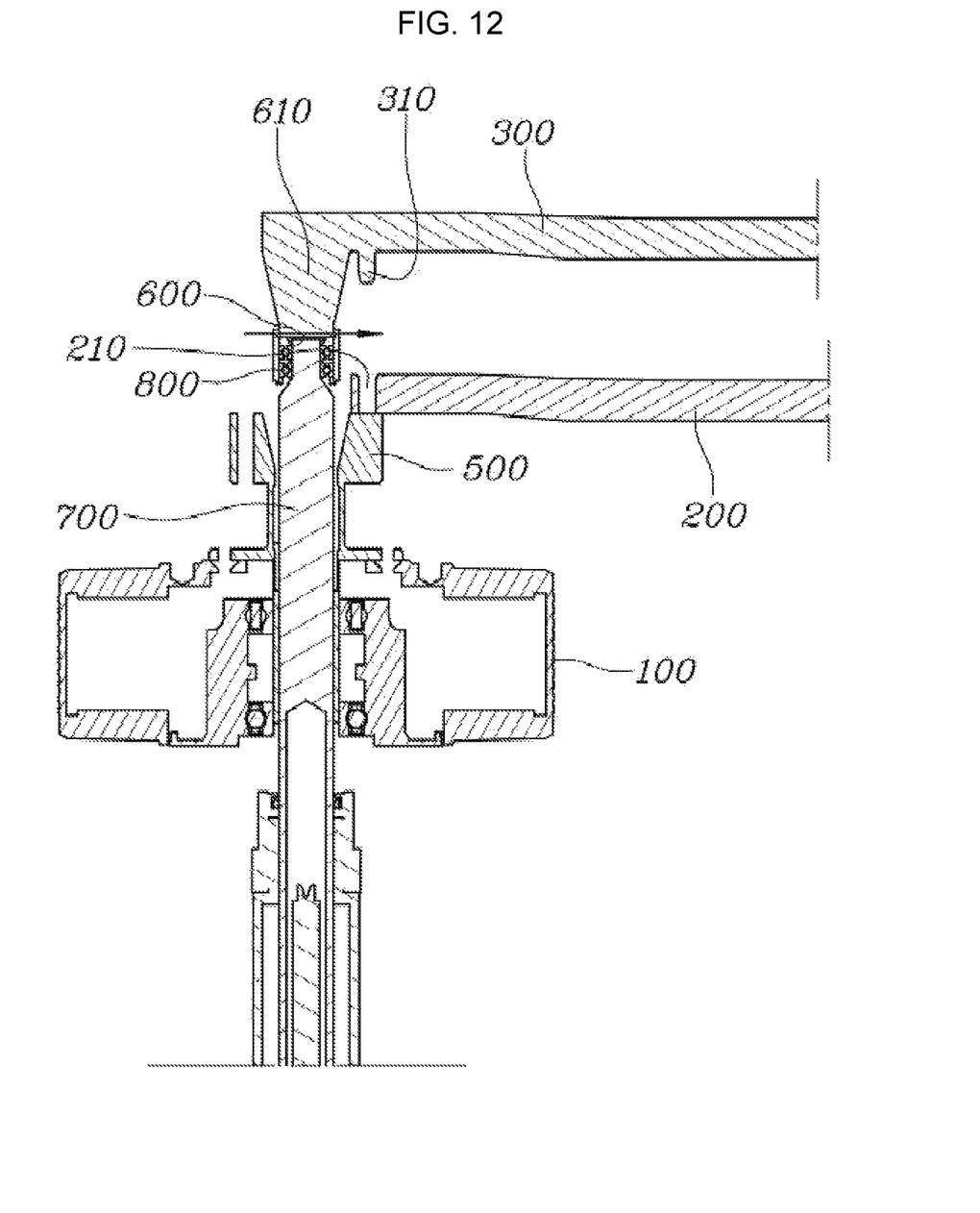
Figure 13:
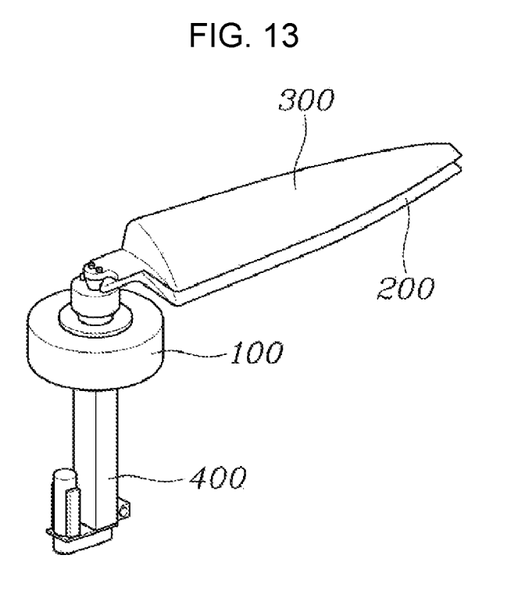
FIG. 13 and FIG. 14 are diagrams for describing that the second blade is moved downwards to be superposed to the first blade in a third blade folding mode in the foldable blade assembly according to various exemplary embodiments of the present invention.
Figure 14:
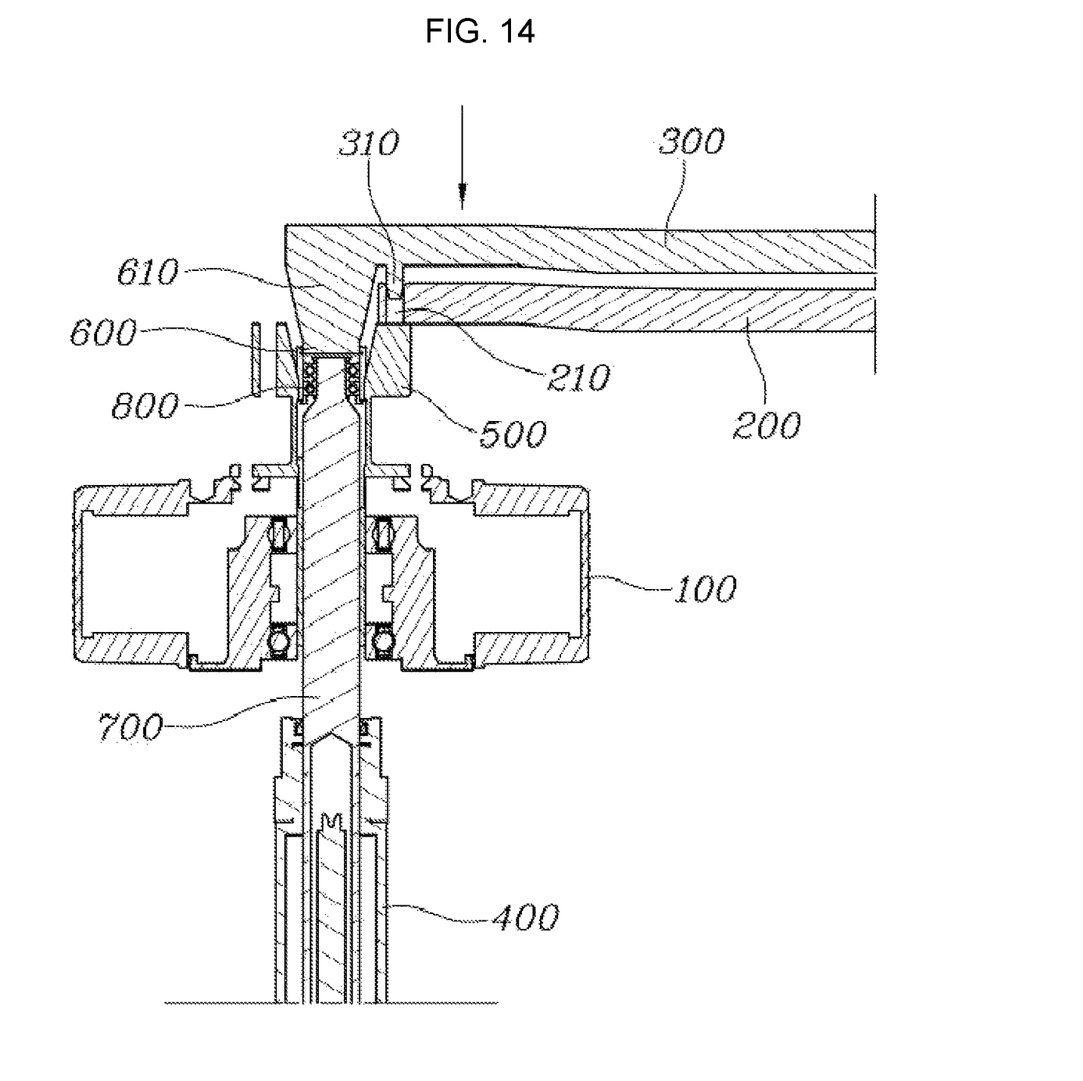

FIG. 1 is a perspective view exemplarily illustrating a foldable blade assembly according to various exemplary embodiments of the present invention, FIG. 2 is an exploded perspective view exemplarily illustrating the foldable blade assembly according to various exemplary embodiments of the present invention, and FIG. 3 is a cross-sectional view exemplarily illustrating the foldable blade assembly according to various exemplary embodiments of the present invention. Furthermore, FIG. 4 is a diagram illustrating a first shaft of the foldable blade assembly according to various exemplary embodiments of the present invention, FIG. 5 is a diagram illustrating a second shaft coupled to a second blade of the foldable blade assembly according to various exemplary embodiments of the present invention, FIG. 6 is a diagram illustrating a second fixing groove formed in the first blade of the foldable blade assembly according to various exemplary embodiments of the present invention, FIGS. 7 and 8 are diagrams for describing a state of a vertical movement mode of the foldable blade assembly according to various exemplary embodiments of the present invention, FIGS. 9 and 10 are diagrams for describing that the second blade is moved upward in a first blade folding mode in the foldable blade assembly according to various exemplary embodiments of the present invention, FIG. 11 and FIG. 12 are diagrams for describing that the first blade is rotated at 180 degrees in a second blade folding mode in the foldable blade assembly according to various exemplary embodiments of the present invention, and FIG. 13 and FIG. 14 are diagrams for describing that the second blade is moved downwards to be superposed to the first blade in a third blade folding mode in the foldable blade assembly according to various exemplary embodiments of the present invention.

Referring to FIG. 1, FIG. 2, and FIG. 3, a foldable blade assembly according to various exemplary embodiments of the present invention may include a first blade 200, a motor 100, a second blade 300, an actuator 400, a first shaft 500, a second shaft 600, and a third shaft 700.

The motor 100 is configured to transmit power to the first blade 200 to rotate the first blade 200. Furthermore, the motor 100 is configured to transmit power to the first blade 200 and the second blade 300 to rotate the first blade 200 and the second blade 300. In a state in which the first blade 200 and the second blade 300 are coupled according to driving of the actuator 400 which will be described below, the power of the motor 100 may be transmitted to the first blade 200 and the second blade 300 to rotate the first blade 200 and the second blade 300 together. In a state in which a coupling between the first blade 200 and the second blade 300 is released, the power of the motor 100 may be transmitted to only the first blade 200 to rotate only the first blade 200.

The first blade 200 may be coupled to the motor 100 through a first shaft 500, which will be described below, and rotated by receiving the power from the motor 100.

A rotation center of the second blade 300 may coincide with a rotation center of the first blade 200. When the second blade 300 is coupled to the first blade 200, the second blade 300 may be rotated with the first blade 200 due to the power transmitted from the motor 100.

The actuator 400 move the second blade 300 upward or downward such that the second blade 300 may be coupled to the first blade 200 and rotated together therewith or the coupling between the second blade 300 and the first blade 200 may be released.

The first shaft 500 may be connected to the first blade 200 and may couple the first blade 200 to the motor 100. The first shaft 500 may transmit the power transmitted from the motor 100 to the first blade 200 to rotate the first blade 200.

The second shaft 600 may be connected to the second blade 300 and coupled to or separated from an internal side of the first shaft 500. When the second shaft 600 is coupled to the internal side of the first shaft 500, the second shaft 600 may transmit the power transmitted from the motor 100 to the second blade 300 to rotate the second blade 300 together with the first blade 200.

The third shaft 700 is connected to the actuator 400. As the actuator 400 is driven, the third shaft 700 may be moved upward or downward to move the second shaft 600 upward or downward.

Referring to FIG. 1 and FIG. 2, a hollow may be formed in the motor 100. Furthermore, the third shaft 700 may pass through the hollow of the motor 100, may be inserted into the first shaft 500, and may be moved upward or downward as the actuator 400 is driven to move the second shaft 600 upward or downward, coupling the second blade 300 to the first blade 200 to be rotated together therewith or releasing the coupling between the second blade 300 and the first blade 200.

In other words, the actuator 400 releases a coupling between the first shaft 500 and the second shaft 600 while moving the third shaft 700 upward to move the second blade 300 upward, releasing the coupling between the first blade 200 and the second blade 300. The actuator 400 couples the first shaft 500 to the second shaft 600 while moving the third shaft 700 downward to move the second blade 300 downward, coupling the first blade 200 to the second blade 300.

Meanwhile, referring to FIG. 4, a through-hole may be formed in a center portion of the first shaft 500, and an internal surface of the through-hole may be formed to be inclined downward to allow a diameter of the internal surface of the through-hole to become narrower toward the motor 100.

Referring to FIG. 5, the second shaft 600 may be formed in a shape corresponding to a shape of the through-hole of the first shaft 500 to be inserted along the inclined surface formed on the internal surface of the through-hole formed in the first shaft 500.

Referring to FIG. 4 and FIG. 5, a female serration 520 or a male serration 520 may be formed on an inclined internal circumferential surface of the through-hole of the first shaft 500, and a male serration 610 or a female serration 610 may be formed on an inclined external circumferential surface of the second shaft 600.

According to various exemplary embodiments of the present invention, when the female serration 520 is formed on the inclined internal circumferential surface of the through-hole of the first shaft 500, the male serration 610 may be formed on the inclined external circumferential surface of the second shaft 600.

Alternatively, when the male serration 520 is formed on the inclined internal circumferential surface of the through-hole of the first shaft 500, the female serration 610 may be formed on the inclined external circumferential surface of the second shaft 600.

As described above, in the foldable blade assembly according to various exemplary embodiments of the present invention, the female serration 520 or the male serration 520 is formed on the inclined internal circumferential surface of the through-hole of the first shaft 500, and the male serration 610 or the female serration 610 on the inclined external circumferential surface of the second shaft 600 so that, in a vertical movement mode, the second shaft 600 may be easily coupled along the inclined internal circumferential surface of the first shaft 500, and in a first blade folding mode, when the second shaft 600 is moved upward, the second shaft 600 is moved upward without interference from the first shaft 500 so that a serration coupling of the second shaft 600 with the first shaft 500 may be easily released.

Meanwhile, according to another exemplary embodiment of the present invention, a protrusion may be formed on the inclined internal circumferential surface of the through-hole of the first shaft 500, and a groove to which the protrusion is coupled may be formed on the inclined external circumferential surface of the second shaft 600. However, the shapes formed on the inclined internal circumferential surface of the through-hole of the first shaft 500 and the inclined external circumferential surface of the second shaft 600 are not limited to the female/male serrations and the protrusion which are described above, and various shapes different from the shapes may be applied to the inclined internal circumferential surface of the first shaft 500 and the inclined external circumferential surface of the second shaft 600 as long as they can easily couple the first shaft 500 to the second shaft 600 or can easily separate the first shaft 500 from the second shaft 600.

In the foldable blade assembly according to various exemplary embodiments of the present invention, a center portion of a rotation axis of the first shaft 500 may coincide with a center portion of a rotation axis of the second shaft 600. As described above, since the rotation axis of the first shaft 500 coincides with the rotation axis of the second shaft 600, when the first shaft 500 and the second shaft 600 are coupled and thus the first blade 200 and the second blade 300 are rotated together, the first blade 200 and the second blade 300 may be stably rotated without shaking.

Meanwhile, referring to FIG. 4, FIG. 5 and FIG. 6, a first fixing groove 510 may be provided on an upper surface of the first shaft 500, and a fixing protrusion 310 may be provided on a lower surface of the second blade 300 at a position corresponding to a position at which the first fixing groove 510 is provided.

In an exemplary embodiment of the present invention, the second blade 300 includes a locking protrusion 330 and the first blade 200 includes a locking groove 230 so that the locking protrusion 330 of the second blade 300 is coupled to the locking groove 230 of the first blade 200 in the vertical movement mode. In an exemplary embodiment of the present invention, the locking protrusion 330 of the second blade 300 is formed to protrude in a longitudinal axis of the second blade 300 and the locking groove 230 of the first blade 200 is formed to be recessed in a longitudinal axis of the first blade 200.

However, in an exemplary embodiment of the present invention, the first blade 200 may include a locking protrusion and the second blade 300 may include a locking groove so that the locking groove of the second blade 300 is coupled to the locking protrusion of the first blade 200 in the vertical movement mode. In an exemplary embodiment of the present invention, the locking protrusion of the first blade 200 is formed to protrude in a longitudinal axis of the first blade 200 and the locking groove of the second blade 300 is formed to be recessed in a longitudinal axis of the second blade 300.

As described above, in the foldable blade assembly according to various exemplary embodiments of the present invention, since the first fixing groove 510 is provided on the upper surface of the first shaft 500 and the fixing protrusion 310 is provided on the lower surface of the second blade 300 at a position corresponding to the position at which the first fixing groove 510 is provided, in the vertical movement mode, the fixing protrusion 310 of the second blade 300 is coupled to the first fixing groove 510 so that a physical movement of the second blade 300 may be limited.

Furthermore, since a second fixing groove 210 is provided on an upper surface of the first blade 200 and the fixing protrusion 310 is provided on the lower surface of the second blade 300 at a position corresponding to a position at which the second fixing groove 210 is provided, in a third blade folding mode, the fixing protrusion 310 of the second blade 300 is coupled to the second fixing groove 210 so that the physical movement of the second blade 300 may be limited.

Meanwhile, the second shaft 600 may be connected to the third shaft 700 through a bearing assembly 800. That is, the bearing assembly is provided between the second shaft 600 and the third shaft 700 so that it is possible to connect the third shaft 700 and the actuator 400 which are not rotated when the second shaft 600 is rotated.

Hereinafter, a blade folding mode including the vertical movement mode, the first blade folding mode, a second blade folding mode, and the third blade folding mode will be described in detail with reference to FIGS. 7 to 14.

According to various exemplary embodiments of the present invention, the vertical movement mode may be a mode in which the first blade 200 and the second blade 300 receive power from the motor 100 to be rotated and then moved upward and lifted. Referring to FIGS. 7 and 8, in the vertical movement mode, since the first shaft 500 and the second shaft 600 are serration-coupled, the power from the motor 100 is transmitted to the first blade 200 and the second blade 300 through the first shaft 500 and the second shaft 600, and thus the first blade 200 and the second blade 300 are rotated so that an urban air mobility including the foldable blade assembly may be lifted. Here, the first blade 200 may receive the power from the motor 100 through the coupling with the first shaft 500 engaged with the motor 100, and the female serration 520 of the first shaft 500 is coupled to the male serration 610 of the second shaft 600 so that the second blade 300 may receive the power transmitted from the motor 100 through the first shaft 500 and the second shaft 600.

Meanwhile, in a cruise mode after the vertical movement mode, since the first blade 200 and the second blade 300 do not need to be rotated, it is necessary to minimize resistance of wind due to the blades in the cruise mode by folding the first blade 200 and the second blade 300. Here, the blade folding mode includes the first blade folding mode, the second blade folding mode, and the third blade folding mode, and these modes will be described in more detail with reference to FIGS. 9 to 14.

Referring to FIG. 9 and FIG. 10, in the first blade folding mode, the actuator 400 moves the third shaft 700 upward to move the second blade 300 upward with a predetermined distance so that the serration coupling between the second shaft 600 and the first shaft 500 may be released. In the instant case, the predetermined distance at which the actuator 400 moves the second blade 300 upward may be a distance which does not interfere with the second blade 300 when the first blade 200 is rotated in the second blade folding mode.

Referring to FIG. 11 and FIG. 12, in the first blade folding mode, the motor 100 may rotate the first blade 200 to be located below the second blade 300. According to various exemplary embodiments of the present invention, as shown in FIG. 9, when the first blade 200 and the second blade 300 are horizontally located in opposite directions, in the first blade folding mode, the motor 100 may rotate the first blade 200 at 180 degrees to be located below the second blade 300.

Referring to FIGS. 13 and 14, in the second blade folding mode, the actuator 400 moves the third shaft 700 downward to move the second blade 300 downward so that the second blade 300 may be superposed to the first blade 200 located below the second blade 300.

Meanwhile, when the cruise mode is completed, the above-described process may be reversely performed to restore the first blade 200 and the second blade 300, which are superposed to each other, to their original states so that the first blade 200 and the second blade 300 may be rotated due to the power transmitted from the motor 100.

Meanwhile, although not shown in detail in the drawings, the foldable blade assembly may further include a controller configured for controlling driving of the motor 100 and the actuator 400. According to various exemplary embodiments of the present invention, the controller may be implemented as a processor chip or the like. The controller controls the driving of the motor 100 and actuator 400 according to the vertical movement mode, the first blade folding mode, the second blade folding mode, and the third blade folding mode so that, in the vertical movement mode, the controller may allow the blade 200 and the second blade 300 to be rotated together due to the power transmitted from the motor 100, and in the cruise mode, the controller may superpose the second blade 300 and the first blade 200 through the first blade folding mode, the second blade folding mode, and the third blade folding mode, minimizing resistance of wind due to the first blade 200 and the second blade 300.

Meanwhile, the above-described foldable blade assembly may be included in an urban air mobility. In other words, as described above, in a vertical movement mode of the urban air mobility, the first blade 200 and the second blade 300 are rotated due to the power transmitted from the motor 100 so that the urban air mobility may be lifted. Furthermore, when the urban air mobility is in a cruise mode, the second blade 300 and the first blade 200 are superposed through the first blade folding mode, the second blade folding mode, and the third blade folding mode so that resistance of wind due to the first blade 200 and the second blade 300 may be minimized.

In accordance with various aspects of the present invention, an actuator and a motor are controlled and thus a first blade and a second blade may be folded so that, in a cruise mode after a vertical movement mode, the first blade and the second blade may be superposed, and thus resistance of wind due to the first blade and the second blade may be minimized in the cruise mode.

Furthermore, since a fixing protrusion is provided on a lower surface of the second blade and fixing grooves are provided on an upper surface of the first shaft and an upper surface of the first blade, in the vertical movement mode and the third blade folding mode, the fixing protrusion is coupled to the fixing groove provided on the upper surface of the first shaft or the upper surface of the first blade so that a position of the second blade may be physically limited.

Furthermore, since the first shaft and the second shaft are formed in inclined shapes and serration-coupled, it is possible to facilitate a coupling between the first shaft and the second shaft or separation of the first shaft from the second shaft in the perpendicular movement mode or a blade folding mode.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A foldable blade assembly comprising:
a first blade;
a motor configured to rotate the first blade;
a second blade of which a rotation center coincides with a rotation center of the first blade;
an actuator configured to move the second blade upward or downward to selectively couple the second blade to the first blade so that the second blade and the first blade are rotated together or a coupling between the second blade and the first blade is released;
a first shaft fixedly connected to the first blade and coupling the first blade to the motor;
a second shaft fixedly connected to the second blade and configured to be coupled to or separated from an internal side of the first shaft; and
a third shaft connected to the actuator and configured to move the second shaft upward or downward by being moved upward or downward as the actuator is driven.

2. The foldable blade assembly of claim 1,
wherein a hollow is formed in the motor; and
wherein the third shaft is aligned to pass through the hollow of the motor, is slidably inserted into the first shaft, and is configured to be moved upward or downward as the actuator is driven to move the second shaft upward or downward so that the second blade is coupled to the first blade to be rotated together with the first blade or the coupling between the second blade and the first blade is released.

3. The foldable blade assembly of claim 1,
wherein a through-hole is formed in a center portion of the first shaft, and an internal surface of the through-hole is formed to be inclined downward to allow a diameter of the internal surface of the through-hole to become narrower toward a center axis of the first shaft; and
wherein the second shaft is formed in a shape corresponding to a shape of the through-hole of the first shaft to be inserted along an inclined surface formed on the internal surface of the through-hole of the first shaft.

4. The foldable blade assembly of claim 3,
wherein one of a female serration or a male serration is formed on an inclined internal circumferential surface of the through-hole of the first shaft; and
wherein another of the male serration or the female serration is formed on an inclined external circumferential surface of the second shaft.

5. The foldable blade assembly of claim 4, wherein, in a vertical movement mode, the first shaft and the second shaft are serration-coupled so that power from the motor is transmitted to the first blade and the second blade through the first shaft and the second shaft, and thus the first blade and the second blade are rotated.

6. The foldable blade assembly of claim 4, wherein, in a first blade folding mode, the actuator moves the third shaft upward to move the second blade upward with a predetermined distance from the first blade, to release a serration coupling between the second shaft and the first shaft.

7. The foldable blade assembly of claim 6, wherein, in a second blade folding mode, the motor rotates the first blade to be located below the second blade.

8. The foldable blade assembly of claim 7, wherein, in a third blade folding mode, the actuator moves the third shaft downward to move the second blade downward, for superposing the second blade to the first blade located below the second blade.

9. The foldable blade assembly of claim 1, wherein a center portion of a rotation axis of the first blade coincides with a center portion of a rotation axis of the second blade.

10. The foldable blade assembly of claim 1,
wherein a first fixing groove is provided on an upper surface of the first shaft;
wherein a fixing protrusion is provided on a lower surface of the second blade at a position corresponding to a position at which the first fixing groove is provided; and
wherein in a vertical movement mode, the fixing protrusion of the second blade is coupled to the first fixing groove.

11. The foldable blade assembly of claim 1,
wherein a second fixing groove is provided on an upper surface of the first blade;
wherein a fixing protrusion is provided on a lower surface of the second blade at a position corresponding to a position at which the second fixing groove is provided; and
wherein in a third blade folding mode, the fixing protrusion of the second blade is coupled to the second fixing groove.

12. The foldable blade assembly of claim 1, wherein the second shaft is connected to the third shaft through a bearing assembly.

13. The foldable blade assembly of claim 1, wherein one of the first blade and the second blade includes a locking protrusion and another of the first blade and the second blade includes a locking groove so that the locking protrusion is coupled to the locking groove in a vertical movement mode.

14. The foldable blade assembly of claim 13,
wherein the locking protrusion is formed to protrude in a longitudinal axis of the one of the first blade and the second blade, and
wherein the locking groove is formed to be recessed in a longitudinal axis of another of the first blade and the second blade.

* * * * *